J. W. WAMPLER.
SPRAY ATTACHMENT FOR HOSE NOZZLES.
APPLICATION FILED JULY 9, 1920.
1,364,163. Patented Jan. 4, 1921.
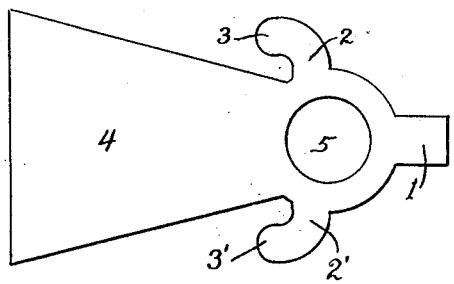
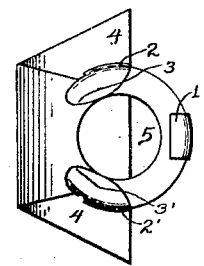
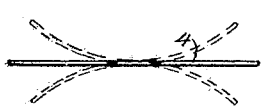
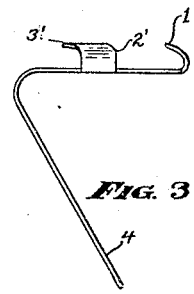
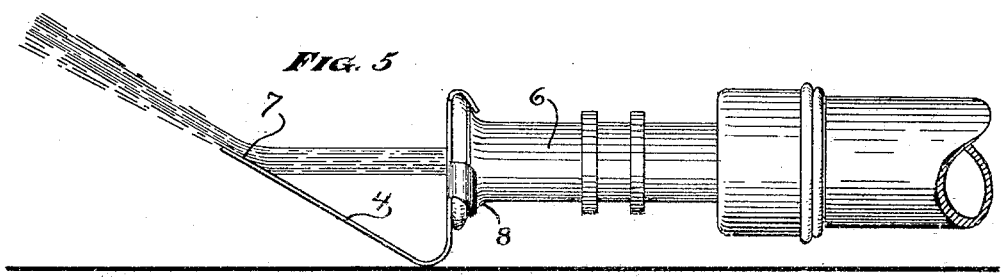
INVENTOR
John W. Wampler
BY
U. G. Charles
ATTORNEY

UNITED STATES PATENT OFFICE.

JOHN W. WAMPLER, OF WICHITA, KANSAS.

SPRAY ATTACHMENT FOR HOSE-NOZZLES.

1,364,163.  Specification of Letters Patent.  Patented Jan. 4, 1921.

Application filed July 9, 1920. Serial No. 395,038.

*To all whom it may concern:*

Be it known that I, JOHN W. WAMPLER, a citizen of the United States, and a resident of Wichita, in the county of Sedgwick and State of Kansas, have invented certain new and useful Improvements in Spray Attachments for Hose-Nozzles, of which the following is a description, reference being had to the accompanying drawings, which form a part of this specification.

My invention relates to improvements in a spray attachment formed in one piece of sheet metal with protruding members adapted to be bent to conform to the shape of any ordinary hose nozzle and fastened firmly to said nozzle by spring action, and one member of said sheet adapted to contact with a stream of water passing through the nozzle and aperture in said device and contacting the outward angling member, causing it to expand in spray forms.

The object of my invention is to provide simple means for manufacturing and transporting a device for the purpose described so that the purchaser of the article can bend the protruding members to fit the type of hose bib in their possession and also bend the spraying end to distribute the spray as desired. It will also be understood that this spraying device may be formed approximately to fit the hose and service desired, and if required, further adjustment can be made by the purchaser of said article.

I attain these objects by the mechanism illustrated in the accompanying drawings, in which—

Figure 1 is a diagrammatic plan showing the form when cut from the sheet metal; Fig. 2 is a rear view looking through the aperture through which the stream passes, showing the device with all members bent in proper form to attach to the hose, and ready for use; Fig. 3 is a side view of Fig. 2; Fig. 4 is an end view of the stream contacting members and the circular dotted lines indicate the possible forms to which said member may be bent at the discretion of the operator, and by which means the spray may be caused to expand or contract; Fig. 5 is a side view of a nozzle attached to a hose and spraying device attached to said nozzle, the elbow of which is resting on the ground or other bearing surface and the stream of water contacting and spraying at an angle by reason of the shape and angular position of the angular protruding end of said spraying attachment.

Similar characters refer to similar parts in the drawings.

1 is a protruding member of sufficient length to bend and clench over the rim of an ordinary hose nozzle. 2 and 2' are members adapted for the same purpose, and in addition the ends 3 and 3' of said members are adapted to contact the back of the rim of nozzle 6 to one side of the diametrical axis and forming a spring to hold said attachment centering so that the stream of water passing from the nozzle will register with the center of the aperture 5 and cause said stream to impinge on the dovetail-shaped member 4, as shown at 7. This dovetail shape is one of the features of the invention.

Having thus described my invention, what I claim as new and desire to secure by Letters Patent is:

A spray attachment comprising a sheet-metal plate bent to provide a nozzle-attaching member and an angularly disposed splash-plate, said attaching member having an opening and being provided with a plurality of radiating prongs adapted to form hooks to engage the end of a nozzle, two of said prongs being curved to act as spring retainers securing said attachment to said nozzle with said opening in register with the nozzle outlet.

JOHN W. WAMPLER.

Witnesses:
M. Y. CHARLES,
W. A. NETHERCOT.